United States Patent
Pandharipande et al.

(10) Patent No.: US 10,440,804 B2
(45) Date of Patent: Oct. 8, 2019

(54) OCCUPANCY MESSAGING IN WIRELESS NETWORKED LIGHTING SYSTEM

(71) Applicant: SIGNIFY HOLDING B.V., Eindhoven (NL)

(72) Inventors: Ashish Vijay Pandharipande, Eindhoven (NL); David Ricardo Caicedo Fernandez, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/741,273

(22) PCT Filed: Jun. 23, 2016

(86) PCT No.: PCT/EP2016/064576
§ 371 (c)(1),
(2) Date: Dec. 31, 2017

(87) PCT Pub. No.: WO2017/005499
PCT Pub. Date: Jan. 12, 2017

(65) Prior Publication Data
US 2018/0199415 A1    Jul. 12, 2018

(30) Foreign Application Priority Data
Jul. 6, 2015   (EP) .................................. 15175447

(51) Int. Cl.
*H05B 37/02* (2006.01)
(52) U.S. Cl.
CPC ..... *H05B 37/0272* (2013.01); *H05B 37/0227* (2013.01)

(58) Field of Classification Search
CPC ............ H05B 37/0227; H05B 37/0245; H05B 37/0272; H05B 37/029
(Continued)

(56) References Cited

U.S. PATENT DOCUMENTS

| 6,912,429 | B1 | 6/2005 | Bilger |
| 7,608,807 | B2 | 10/2009 | Hick |

(Continued)

FOREIGN PATENT DOCUMENTS

| CN | 102014550 A | 4/2011 |
| WO | 0111926 A1 | 2/2001 |

(Continued)

*Primary Examiner* — Tung X Le
(74) *Attorney, Agent, or Firm* — Daniel J. Piotrowski (57) ABSTRACT

Devices (10) comprise target detectors (11) for detecting presences of targets in first areas (1) and transmitters (12) for in response to detected presences transmitting multicast messages to controllers (20) and lamps (21-24) in wireless networked lighting systems. Such multicast messages increase reliabilities of the systems. The multicast messages switch on the lamps (21-24). Preferably, the multicast messages are only transmitted in case relatively small amounts of light are detected in second areas (2). In case relatively large amounts of light are detected in the second areas (2), unicast messages are in response to detected presences transmitted from the devices (10) to the controllers (20) that in response control the lamps (21-24) to be switched on. The first and second areas (1, 2) may be at least partly overlapping areas. The devices (10) may comprise internal light detectors (13) for detecting the amounts of light in the second areas (2) or receivers for receiving light detection information from external light detectors.

13 Claims, 4 Drawing Sheets (58) Field of Classification Search
USPC .................................. 315/152, 307, 312
See application file for complete search history.

(56) References Cited

U.S. PATENT DOCUMENTS

| | | | |
|---|---|---|---|
| 7,889,051 B1* | 2/2011 | Billig | H04L 12/2818 |
| | | | 340/5.23 |
| 8,410,706 B2 | 4/2013 | Steiner | |
| 8,648,550 B2 | 2/2014 | Staab | |
| 2004/0056771 A1 | 3/2004 | Dungan | |
| 2012/0086345 A1* | 4/2012 | Tran | H05B 33/0845 |
| | | | 315/158 |
| 2013/0257292 A1 | 10/2013 | Verfuertha | |
| 2014/0167642 A1 | 6/2014 | Chobot | |
| 2014/0354160 A1 | 12/2014 | Aggarwal et al. | |
| 2014/0375206 A1 | 12/2014 | Holland et al. | |
| 2015/0084514 A1* | 3/2015 | Anthony | H05B 33/0863 |
| | | | 315/131 |
| 2015/0295411 A1* | 10/2015 | Courtney | H02J 3/14 |
| | | | 700/295 |

FOREIGN PATENT DOCUMENTS

| | | |
|---|---|---|
| WO | 2006065653 A2 | 6/2006 |
| WO | 2010064167 A2 | 6/2010 |
| WO | 2012085738 A1 | 6/2012 |
| WO | 2014078854 A1 | 5/2014 |

\* cited by examiner

OCCUPANCY MESSAGING IN WIRELESS NETWORKED LIGHTING SYSTEM

CROSS-REFERENCE TO PRIOR APPLICATIONS

This application is the U.S. National Phase application under 35 U.S.C. § 371 of International Application No. PCT/EP2016/064576, filed on Jun. 23, 2016 which claims the benefit of European Patent Application No. 15175447.0, filed on Jul. 6, 2015. These applications are hereby incorporated by reference herein.

FIELD OF THE INVENTION

The invention relates to a device configured to form part of a wireless networked lighting system that comprises a controller and lamps. The invention further relates to a system comprising such a device and further comprising the controller and/or one or more of the lamps, and to a method. Examples of such a device are occupancy sensors and lamps comprising such occupancy sensors.

BACKGROUND OF THE INVENTION

WO 2006/065653 A2 discloses a distributed intelligence ballast system and an extended lighting control protocol. As described in its § 0147, power and control are distributed among intelligent devices, so that a failure of a controller does not cause an entire network to fail. Thereto, the ballasts have got an increased intelligence. Each device (ballast) on the wired network that is enabled with the extended protocol can act as a controller.

In general, wireless networked lighting systems, such as wireless networked smart lighting systems, comprise a central controller and distributed sensing devices and distributed lamps. A distributed sensing device sends a first message with a sensing result to the centralized controller. In response to this first message, the central controller sends one or more second messages to several distributed lamps to control these distributed lamps.

In case the first message transmitted from the sensing device to the central controller gets lost or gets delayed, there is a problem in that said several lamps are not switched on or are switched on too late.

WO 01/11926 A1 discloses a lighting control system including a wireless remote sensor.

SUMMARY OF THE INVENTION

It is an object of the invention to provide an improved device. Further objects of the invention are to provide a system and an improved method.

According to a first aspect, a device is provided, which device is configured to form part of a wireless networked lighting system that comprises a controller and lamps, wherein the device comprises
a target detector configured to detect a presence of a target in a first area, and
a transmitter configured to transmit a multicast message to the controller and to one or more of the lamps in response to a detection of the presence of the target in the first area when the device establishes a need for a fast response and a unicast message to the controller when the device establish a relatively slower response is acceptable.

In the above manner the device as described above enables to select a messaging policy in the form of either a multi-cast or a uni-cast approach to counter the effect of a message loss or delay, which might result in several lamps not switching on or switching on late when there is a need for fast switching.

A device is provided, which device is configured to form part of a wireless networked lighting system that comprises a controller and lamps. An example of such a wireless networked lighting system is a wireless networked smart lighting system, wherein the controller is a central controller, and wherein the lamps are distributed lamps. The device comprises a target detector configured to detect a presence of a target in a first area, and comprises a transmitter configured to transmit a multicast message to the controller and to one or more of the lamps in response to a detection of the presence of the target in the first area. Such a transmission is a wireless transmission via a wireless protocol, and such a transmitter is a wireless transmitter. Examples of such a wireless protocol are ZigBee™ and 6LoWPAN, without having excluded other kinds of wireless protocols.

By transmitting a multicast message to the controller that may be located relatively far from the device, as well as to one or more of the lamps that may be located relatively close to the device, shorter and parallel messaging routes have been created. As a result, a probability that a lamp is not informed or is informed too late of the detection of the presence of the target in the first area has decreased. Such a device improves a reliability of the wireless networked lighting system, which is a great technical advantage. It is to be noted that the target may be an animal, like a human being or a cattle. The target may also be an object, for example a vehicle like a car or motorcycle. WO 2006/065653 A2 does not disclose a wireless transmission of a multicast message from a device comprising a person detector and a wireless transmitter to a controller as well as to one or more lamps. In WO 2006/065653 A2, the wired network is based on a serial power bus and a serial control bus.

The first area can for example be a room of a building or (a part of) a floor of a building or (a part of) a building or (a part of) a street, or a cabin of a boat or (a part of) a deck of a boat or (a part of) a boat etc.

An embodiment of the device is defined, wherein the multicast message is configured to switch on at least one lamp of the one or more lamps. In response to the detection of the presence of the target in the first area, at least one of the lamps that have received the multicast message is to be switched on. The switching on of a lamp may comprise an increase of a light intensity of the lamp from a zero level to whatever level larger than zero.

An embodiment of the device is defined, wherein the multicast message comprises a device-identification, one or more lamp-identifications, a controller-identification and a detection-result. A device-identification identifies the device as the source that transmits the multicast message. A lamp-identification identifies a particular lamp as one of the destinations that receives the multicast message. A controller-identification identifies the controller as one of the destinations that receives the multicast message. A detection-result defines a kind of detection, such as a change from an absence to a presence of the target in the first area. The multicast message may further define this first area.

An embodiment of the device is defined, wherein the transmitter is configured to transmit the multicast message to the controller and to the one or more of the lamps for a detected first amount of light in a second area, and wherein the transmitter is configured to transmit a unicast message to the controller in response to the detection of the presence of the target in the first area for a detected second amount of light in the second area, the first amount of light being smaller than a threshold value and the second amount of light being larger than the threshold value, and the first and second areas being at least partly overlapping areas. In a second area, that may partly or fully coincide with the first area, an amount of light is to be detected. In case a first, relatively small amount of light is detected in the second area, the switching on of one or more lamps present in/near the first/second area is relatively important to a target entering the first area, and the multicast message is to be transmitted, to the controller as well as to one or more of the lamps, to increase a probability that the lamps are informed well. In case a second, relatively large amount of light is detected in the second area, the switching on of one or more lamps present in/near the first/second area is relatively unimportant to a target entering the first area, and the unicast message can be transmitted to the controller only. The first, relatively small amount of light is smaller than a threshold value, and the second, relatively large amount of light is larger than the threshold value. One of said amounts of light may further be identical to the threshold value.

Usually, to be able to detect the amount of light in the second area, a light detector is used. Such a light detector may be an internal detector and form part of the device, and may provide the device with light detection information defining the amount of light in the second area. Alternatively, such a light detector may be an external detector and be located outside the device, in which case the device is to be provided with a receiver for receiving the light detection information defining the amount of light in the second area from the external light detector. In both cases, the multicast message may further define the detected amount of light and/or a lamp-setting.

An embodiment of the device is defined, wherein the device comprises an occupancy sensor. The device can be produced etc. in the form of an occupancy sensor.

An embodiment of the device is defined, wherein the device comprises a lamp, and wherein the transmitter is configured to transmit the multicast message to the controller and to one or more of the other lamps. The device can be produced etc. in the form of a lamp.

An embodiment of the device is defined, wherein the lamp is configured to be switched on in response to the detection of the presence of the target in the first area, and wherein the multicast message is configured to switch on at least one lamp of the one or more other lamps.

An embodiment of the device is defined, wherein the multicast message comprises a lamp-identification, one or more other lamp-identifications, a controller-identification and a detection-result.

An embodiment of the device is defined, wherein, in a daylight mode, the lamp is configured to stay at a minimum dimming level after being switched on or is configured to be not switched off. The lamp may detect the daylight mode itself via its internal light detector or may be informed of the daylight mode by another lamp or by an external light detector or by the controller.

An embodiment of the device is defined, wherein the transmitter is configured to transmit the multicast message to the controller and to the one or more of the other lamps for a detected first amount of light in a second area, and wherein the transmitter is configured to transmit a unicast message to the controller in response to the detection of the presence of the target in the first area for a detected second amount of light in the second area, the first amount of light being smaller than a threshold value and the second amount of light being larger than the threshold value, and the first and second areas being at least partly overlapping areas.

An embodiment of the device is defined, further comprising
an internal light detector configured to detect the amount of light in the second area, or
a receiver configured to receive light detection information from an external light detector configured to detect the amount of light in the second area.

An embodiment of the device is defined, further comprising
a calculator configured to calculate a lamp-setting for the detected amount of light in the second area.

Usually, a calculator for calculating a lamp-setting may form part of an occupancy sensor or a lamp, whereby the occupancy sensor or the lamp may further comprise the internal light detector or the receiver both discussed above for being informed of the detected amount of light in the second area.

According to a second aspect, a system is provided comprising the device as defined above and further comprising the controller and/or one or more of the lamps.

The embodiment wherein the lamp is configured to stay at a minimum dimming level after being switched on or is configured to be not switched off is particularly advantageous in case a device in the form of an occupancy sensor or a lamp does not have access to light detection information from an internal or external light detector. The lamp may then decide to react to the multicast message depending on its own state (on or off). So, there are different circumstances depending on whether the light detection information is available to the device as well as to the controller or to the controller only. In case the device has access to the light detection information, it can decide to send a unicast message to the controller or to send a multicast message to the controller and to at least one (other) lamp. In case the device has no access to the light detection information, it sends a multicast message to the controller and to at least one (other) lamp, and the lamps may then stay at a minimum dimming level after being switched on or may then be not switched off.

According to a third aspect, a method is provided for operating a wireless networked lighting system that comprises a controller and lamps, the method comprising the steps of detecting a presence of a target in a first area, and transmitting a multicast message to the controller and to one or more of the lamps in response to a detection of the presence of the target in the first area when a need for a fast response is established and a unicast message to the controller in response to the detection of the presence of the target in the first area, in the event it is established that a relatively slower response is acceptable.

Embodiments of the system and of the method correspond with the embodiments of the device. And (a part of) an embodiment of the device and (a part of) another embodiment of the device may be combined.

A basic idea is that a multicast message is to be transmitted to a controller as well as to one or more lamps in response to a detection of a presence of a target in a first area.

A problem to provide an improved device that increases a reliability of a wireless networked lighting system has been solved. Further advantages are that energy is saved and that a user-friendliness of an environment comprising different areas is increased.

These and other aspects of the invention will be apparent from and elucidated with reference to the embodiments described hereinafter.

DETAILED DESCRIPTION OF EMBODIMENTS

Figure 1:
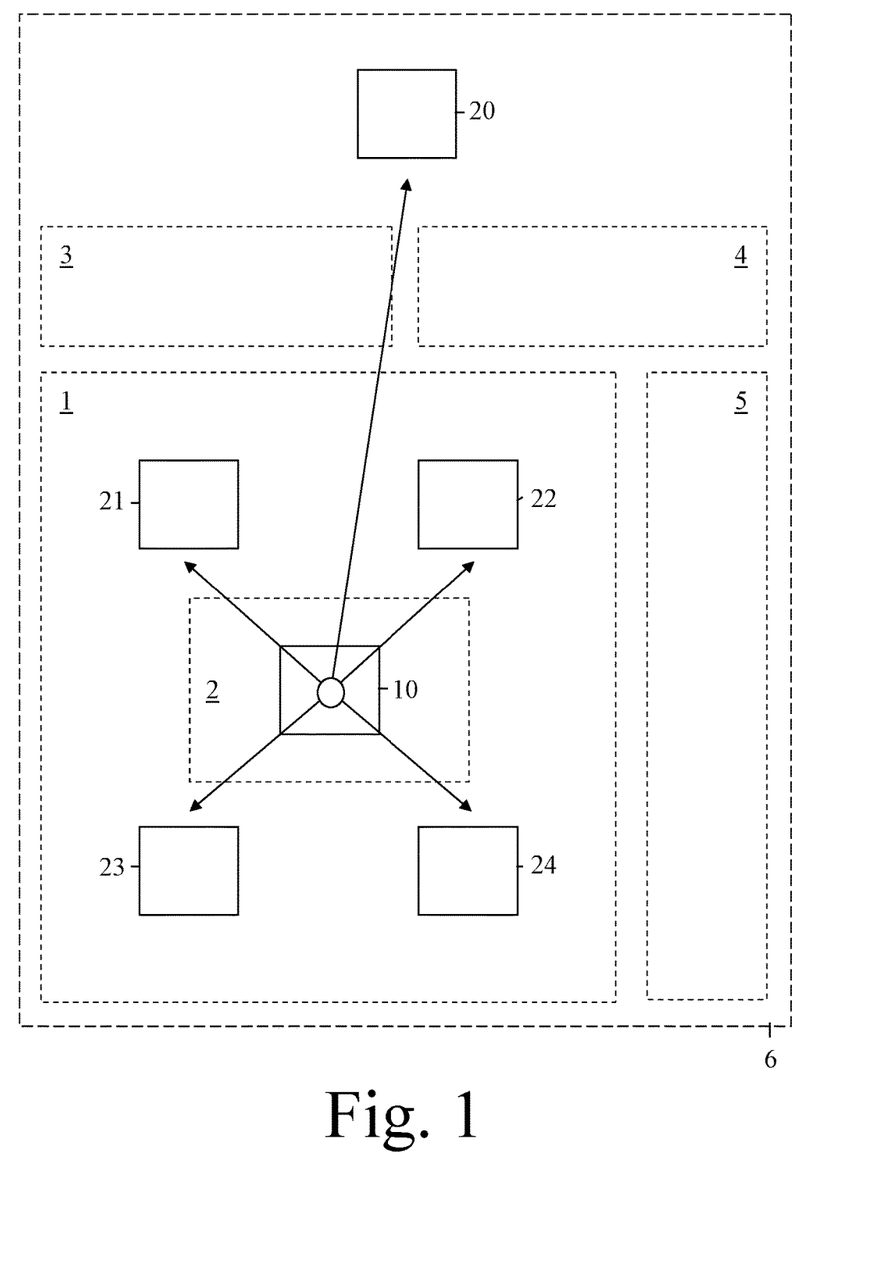
FIG. 1 shows a wireless networked lighting system in a first situation.

In the FIG. 1, a wireless networked lighting system is shown in a first situation. The wireless networked lighting system such as a wireless networked smart lighting system comprises a controller 20, lamps 21-24, and a device 10. The device 10 is configured to detect a presence of a target, for example in this embodiment a person, in a first area 1 and is in this particular case configured to detect an amount of light in a second area 2 or to receive information about a detected amount of light in the second area 2. The first and second areas 1, 2 are at least partly overlapping areas. Usually, these first and second areas 1, 2 will be relatively coinciding areas.

In this first situation, a detected first amount of light in the second area 2 is smaller than a threshold value, and the device 10 is in this first situation configured to transmit a multicast message to the controller 20 and to one or more of the lamps 21-24. This multicast message is configured to switch on at least one lamp of the one or more lamps 21-24 that have received this multicast message.

Figure 2:
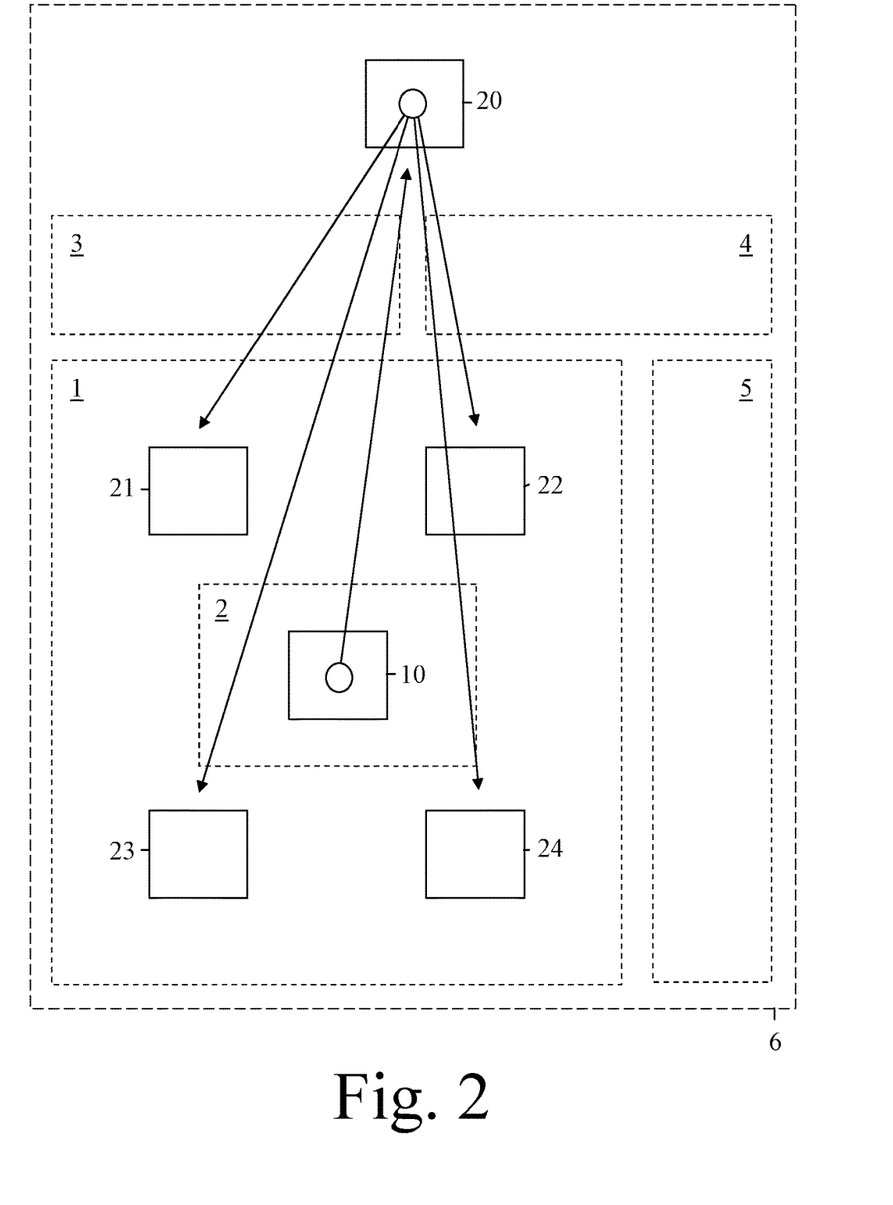
FIG. 2 shows a wireless networked lighting system in a second situation.

In the FIG. 2, a wireless networked lighting system is shown in a second situation. In this second situation, a detected second amount of light in the second area 2 is larger than a threshold value, and the device 10 is in this second situation configured to transmit a unicast message to the controller 20. In response to a reception of this unicast message, the controller 20 will send a multicast message to one or more of the lamps 21-24 or will send a respective unicast message to a respective one of the one or more lamps 21-24, to switch one or more of the lamps 21-24 on.

The lamps 21-24 are usually located at a relatively small distance from the device 10, and the controller 20 is usually located at a relatively large distance from the device 10. In case the unicast message transmitted from the device 10 to the controller 20 in the second situation gets lost or gets delayed, the one or more lamps 21-24 are not switched on or are switched on too late.

So, in the first, relatively dark situation, the switching on of the one or more lamps 21-24 present in/near the first area 1 is relatively important to a person entering the first area 1, and the multicast message is to be transmitted, to increase a probability that the lamps 21-24 are informed well. In the second, relatively bright situation, the switching on of the one or more lamps 21-24 present in/near the first area 1 is relatively unimportant to a person entering the first area 1, and the unicast message can be transmitted.

Further areas, such as for example the areas 3, 4 and 5, may be present, each one comprising a device and one or more lamps, whereby all areas 1-5 may form part of a larger area 6, such as a building or a boat or a part thereof. More controllers may be present too, with each controller controlling one or more areas. The first and second areas 1, 2 may be relatively coinciding areas, without having excluded other situations. The second area 2 may for example be smaller than the first area 1, and for example comprise one or more specific locations within the first area 1, specifically chosen for detecting amounts of light, such as centers of rooms etc. The first area 1 may alternatively be smaller than the second area 2, and for example comprise one or more specific locations within the second area 2, specifically chosen for detecting presences of persons, such as small areas near doors in rooms etc. More than one device 10 per area 1, 3, 4, 5 may be present.

Figure 3:
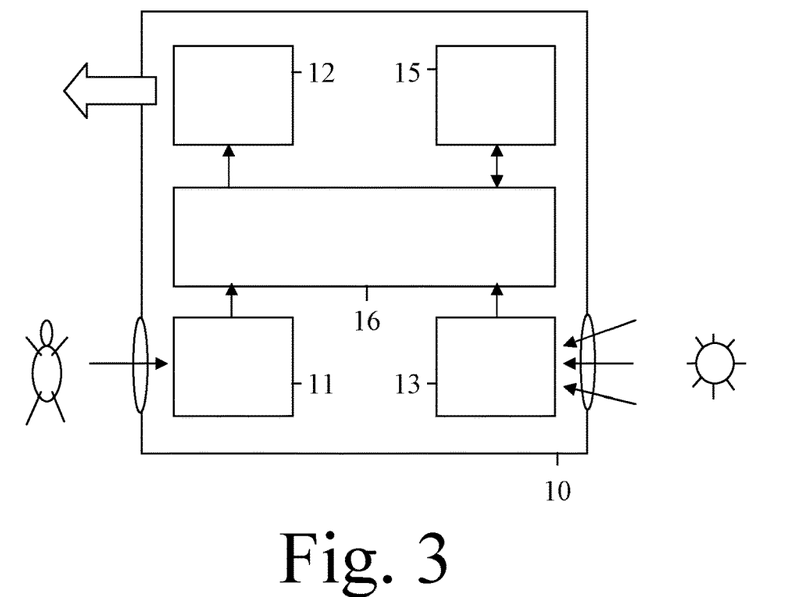
FIG. 3 shows a first embodiment of a device.

In the FIG. 3, a first embodiment of a device is shown. The device 10, such as for example an occupancy sensor, comprises a target detector 11 (for example a person detector) configured to detect a presence of a target (e.g. a person) in a first area 1 shown in the FIGS. 1 and 2. The device 10 further comprises a transmitter 12 configured to transmit a multicast message to the controller 20 and to one or more of the lamps 21-24 all shown in the FIGS. 1 and 2 in response to a detection of the presence of the target in the first area 1. Thereto, a processor 16 is coupled to the target detector 10 for receiving target detection information from the target detector 11 and to the transmitter 12 for providing the transmitter 12 with transmission information. As discussed earlier, the target may be an animal like a human being in this embodiment, or a domestic animal. The target may also be an object, for example a car. The target may be unidentified, i.e. any human being. In a variant of this embodiment, that may be applied to all the other embodiments, the target detector 11 is adapted to recognize/identify a specific target, for example a specific individual and to cause the device to transmit the multicast message only if the specific individual has been recognized.

Preferably, the device 10 further comprises an internal light detector 13 that is configured to detect an amount of light in the second area 2 shown in the FIGS. 1 and 2. In that case, the transmitter 12 is configured to transmit the multicast message to the controller 20 and to the one or more of the lamps 21-24 for a detected relatively small first amount of light in the second area 2, and the transmitter 12 is configured to transmit a unicast message to the controller 20 in response to the detection of the presence of the target in the first area 1 for a detected relatively large second amount of light in the second area 2. Thereto, the processor 16 is coupled to the internal light detector 13 for receiving light detection information from the internal light detector 13.

Preferably, the device 10 further comprises a calculator 15 configured to calculate a lamp-setting for a detected amount of light in the second area 2. Thereto, the processor 16 is coupled to the calculator 15 for providing the calculator 15 with (a processed version of) the light detection information and for receiving calculation information from the calculator 15. Alternatively, the calculator 15 may form part of the processor 16, or the processor 16 may form part of the calculator 15, with a bus or connections being present between the detectors 11 and 13 and the transmitter 12 and the calculator 15. The calculator may use the (processed version of) the light detection information and may further possibly use controller information received from the controller 20 in whatever way.

Figure 4:
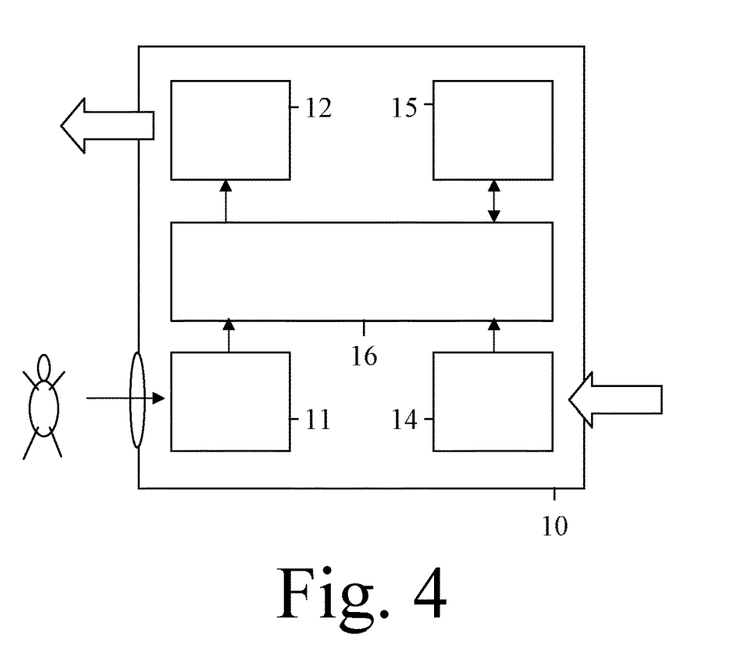
FIG. 4 shows a second embodiment of a device.

In the FIG. 4, a second embodiment of a device is shown. This second embodiment only differs from the first embodiment in that the internal light detector 13 has been replaced by a receiver 14 configured to receive light detection information from an external light detector configured to detect the amount of light in the second area 2. All possibilities discussed for the FIG. 3 are also valid for the FIG. 4. In addition, the receiver 14 may further be used to receive the controller information from the controller 20.

Generally, the multicast message is configured to switch on at least one lamp of the one or more lamps 21-24. The switching on of a lamp may comprise an increase of a light intensity of the lamp from a zero level to a non-zero level. The multicast message may comprise a device-identification, one or more lamp-identifications, a controller-identification and a detection-result, and may further comprise (a definition of) the first area 1, (a definition of) the second area 2, and (a definition of) the non-zero level.

Figure 5:
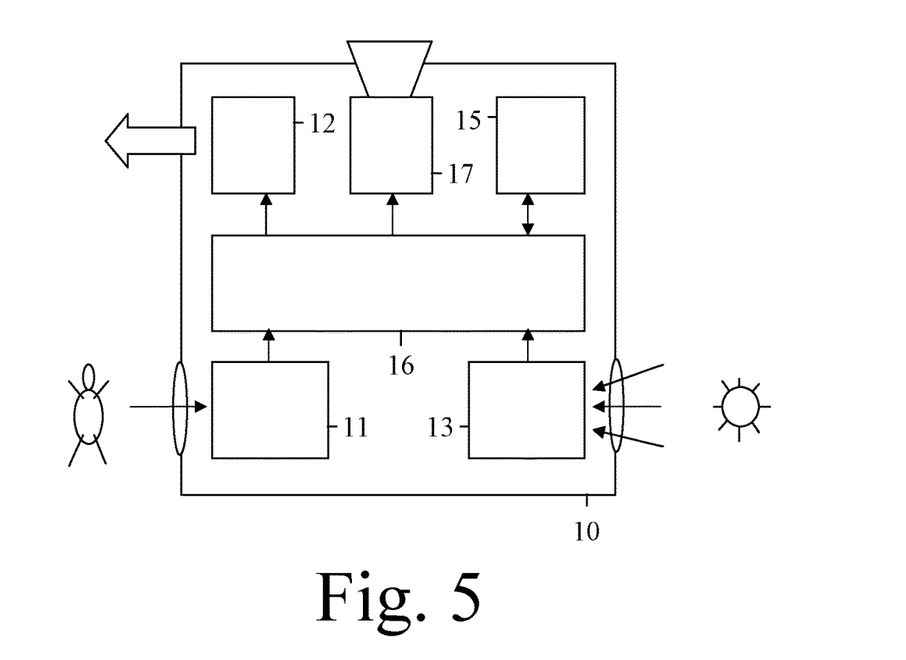
FIG. 5 shows a third embodiment of a device.

In the FIG. 5, a third embodiment of a device is shown. This third embodiment of the device 10, such as for example a lamp, only differs from the first embodiment in that a light source 17 has been added. This light source 17 is coupled to the processor 16 or, in case the processor forms part of the calculator 15, to the bus or the connections discussed before, or to the calculator 15 comprising the processor.

Figure 6:
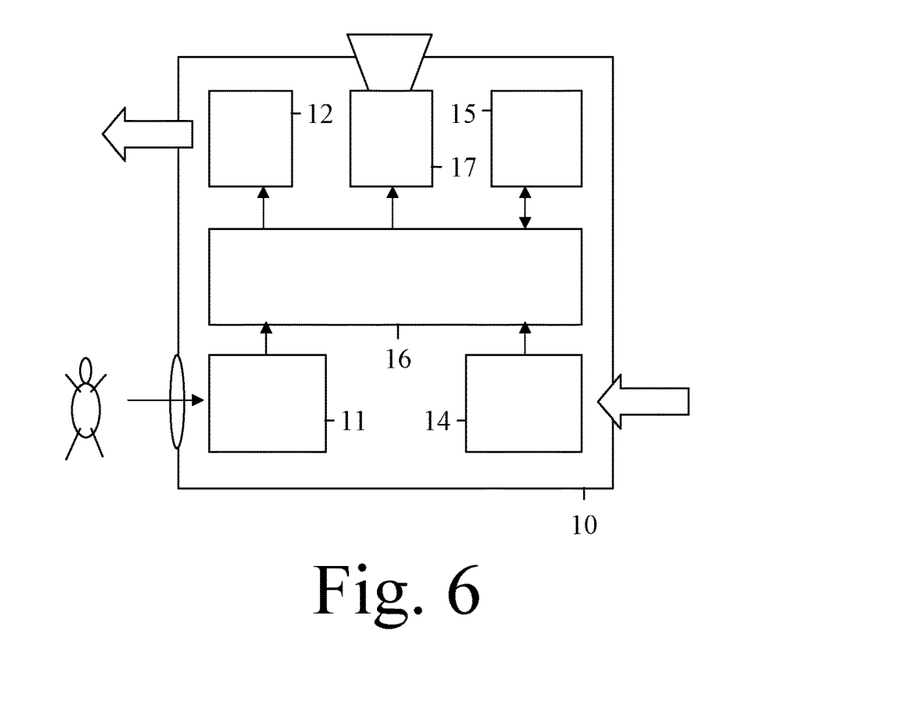
FIG. 6 shows a fourth embodiment of a device.

In the FIG. 6, a fourth embodiment of a device is shown. This fourth embodiment of the device 10, such as for example a lamp, only differs from the second embodiment in that a light source 17 has been added. This light source 17 is coupled to the processor 16 or, in case the processor forms part of the calculator 15, to the bus or the connections discussed before, or to the calculator 15 comprising the processor.

All possibilities discussed for the FIGS. 3 and 4 are also valid for the FIGS. 5 and 6. In addition, in a daylight mode, the light source 17 may be configured to stay at a minimum dimming level after being switched on or may be configured to be not switched off. The controller 20 may inform the device 10 of this daylight mode through a unicast message or through a multicast message, or another lamp 21-24 may inform the device 10 of this daylight mode, or the internal light detector 13 may detect this daylight mode and inform the device 10, or an external light detector may inform the device 10 of this daylight mode. In view of the FIGS. 5 and 6, in the FIGS. 1 and 2, each one of the lamps 21-24 may be identical to the device 10 when comprising the light source 17, or not.

A device is configured to form part of a wireless networked lighting system in case the device can transmit a message to another part of the wireless networked lighting system and/or in case the device can receive a message from another part of the wireless networked lighting system. A wireless networked lighting system comprises a controller and lamps, wherein the controller is configured to control the lamps. The wireless networked lighting system may further comprise a device with a presence detector (such a device is here named an occupancy sensor), or one or more of the lamps may comprise such a presence detector. A presence detector can detect a presence of a person directly for example through heat radiated by the person or through a movement made by the person etc. A presence detector can also detect a presence of a person indirectly for example through a movement of an object moved by the person or through an operation performed by the person or through a detection of an apparatus carried by the person etc.

Summarizing, devices 10 comprise target detectors 11, for example person detectors for detecting presences of targets in first areas 1 and transmitters 12 for in response to detected presences transmitting multicast messages to controllers 20 and lamps 21-24 in wireless networked lighting systems. Such multicast messages increase reliabilities of the systems. The multicast messages switch on the lamps 21-24. Preferably, the multicast messages are only transmitted in case relatively small amounts of light are detected in second areas 2. In case relatively large amounts of light are detected in the second areas 2, unicast messages are in response to detected presences transmitted from the devices 10 to the controllers 20 that in response control the lamps 21-24 to be switched on. The first and second areas 1, 2 may be at least partly overlapping areas. The devices 10 may comprise internal light detectors 13 for detecting the amounts of light in the second areas 2 or receivers for receiving light detection information from external light detectors.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device configured to form part of a wireless networked lighting system that comprises a controller and lamps, wherein the device comprises:
    a target detector configured to detect a presence of a target in a first area, and
    a transmitter configured to transmit:
        a multicast message to the controller and to one or more of the lamps in response to a detection of the presence of the target in the first area when the device establishes a need for a first response speed,
        a unicast message to the controller when the device establishes that the first response speed is not needed and so that a slower second response speed is acceptable; and
    wherein the transmitter is configured to transmit the multicast message to the controller and to the one or more of the lamps for a detected first amount of light in a second area, and wherein the transmitter is configured to transmit the unicast message to the controller in response to the detection of the presence of the target in the first area for a detected second amount of light in the second area, the first amount of light being smaller than a threshold value and the second amount of light being larger than the threshold value, and the first and second areas being at least partly overlapping areas.

2. The device as defined in claim 1, wherein the multicast message is configured to switch on at least one lamp of the one or more lamps.

3. The device as defined in claim 1, wherein the multicast message comprises a device-identification, one or more lamp-identifications, a controller-identification and a detection-result.

4. The device as defined in claim 1, further comprising
    an internal light detector configured to detect the amount of light in the second area, or
    a receiver configured to receive light detection information from an external light detector configured to detect the amount of light in the second area.

5. The device as defined in claim 1, wherein the device is an occupancy sensor.

6. The device as defined in claim 1, wherein the device comprises a lamp, and wherein the transmitter is configured to transmit the multicast message to the controller and to one or more of the other lamps.

7. The device as defined in claim 6, wherein the lamp is configured to be switched on in response to the detection of the presence of the target in the first area, and wherein the multicast message is configured to switch on at least one lamp of the one or more other lamps.

8. The device as defined in claim 6, wherein the multicast message comprises a lamp-identification, one or more other lamp-identifications, a controller-identification and a detection-result.

9. The device as defined in claim 6, wherein, in a daylight mode, the lamp is configured to stay at a minimum dimming level after being switched on or is configured to be not switched off.

10. The device as defined in claim 6, wherein the transmitter is configured to transmit the multicast message to the controller and to the one or more of the other lamps for a detected first amount of light in a second area, and wherein the transmitter is configured to transmit the unicast message to the controller in response to the detection of the presence of the target in the first area for a detected second amount of light in the second area, the first amount of light being smaller than a threshold value and the second amount of light being larger than the threshold value, and the first and second areas being at least partly overlapping areas.

11. The device as defined in claim 1, further comprising a calculator configured to calculate a lamp-setting for the detected amount of light in the second area.

12. A system comprising the device as defined in claim 1 and further comprising the controller and/or one or more of the lamps.

13. A method for operating a wireless networked lighting system that comprises a controller and lamps, the method comprising the steps of:
  detecting a presence of a target in a first area, and
  transmitting
    a multicast message to the controller and to one or more of the lamps in response to a detection of the presence of the target in the first area when a need for a first response speed is established, and
    a unicast message to the controller in response to the detection of the presence of the target in the first area, in the event it is established that the first response speed is not needed and so that a slower second response speed is acceptable; and
  wherein the multicast message is transmitted for a detected first amount of light in a second area, and wherein the unicast message is transmitted in for a detected second amount of light in the second area, the first amount of light being smaller than a threshold value and the second amount of light being larger than the threshold value, and the first and second areas being at least partly overlapping areas.

* * * * *